(12) United States Patent
Silveri et al.

(10) Patent No.: US 8,257,222 B2
(45) Date of Patent: Sep. 4, 2012

(54) PREVENTING GEAR SHIFT CYCLING OF A HYBRID ELECTRIC VEHICLE

(75) Inventors: Andrew J. Silveri, Royal Oak, MI (US); Ihab S. Soliman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 908 days.

(21) Appl. No.: 12/192,254

(22) Filed: Aug. 15, 2008

(65) Prior Publication Data
US 2010/0041512 A1 Feb. 18, 2010

(51) Int. Cl.
*B60W 10/08* (2006.01)
(52) U.S. Cl. .................... 477/3; 180/65.285; 701/22
(58) Field of Classification Search . 477/3; 180/65.265, 180/65.285, 197; 701/22
See application file for complete search history.

(56) References Cited

U.S. PATENT DOCUMENTS

| | | | |
|---|---|---|---|
| 7,040,439 B2* | 5/2006 | Kowatari et al. ............. 180/197 |
| 7,054,726 B2* | 5/2006 | Kowatari et al. ............. 701/22 |
| 7,071,642 B2* | 7/2006 | Wilton et al. ............. 318/268 |
| 7,115,064 B2 | 10/2006 | Masterson et al. | |
| 7,163,480 B2* | 1/2007 | Supina et al. ............. 475/5 |
| 7,222,014 B2* | 5/2007 | Tao et al. ............. 701/87 |
| 7,223,201 B2* | 5/2007 | Colvin et al. ............. 477/5 |
| 7,223,203 B2* | 5/2007 | Yamazaki et al. ............. 477/15 |
| 7,313,470 B2* | 12/2007 | Zaremba et al. ............. 701/22 |
| 7,314,424 B2* | 1/2008 | Supina et al. ............. 477/3 |
| 7,377,877 B2* | 5/2008 | Ogata ............. 477/3 |
| 7,407,026 B2* | 8/2008 | Tamor ............. 180/65.28 |
| 7,503,871 B2* | 3/2009 | Kozarekar et al. ............. 477/3 |
| 7,517,298 B2* | 4/2009 | Ortmann ............. 477/3 |
| 7,673,714 B2* | 3/2010 | Soliman et al. ............. 180/65.265 |
| 7,691,026 B2* | 4/2010 | Heap et al. ............. 477/3 |
| 7,704,185 B2* | 4/2010 | Babcock et al. ............. 477/3 |
| 7,743,860 B2* | 6/2010 | Soliman et al. ............. 180/65.265 |
| 7,753,150 B2* | 7/2010 | Tamor ............. 180/65.265 |
| 7,798,938 B2* | 9/2010 | Matsubara et al. ............. 477/3 |
| 7,822,524 B2* | 10/2010 | Tabata et al. ............. 701/53 |
| 7,828,693 B2* | 11/2010 | Soliman et al. ............. 477/3 |
| 7,828,694 B2* | 11/2010 | Silveri et al. ............. 477/3 |
| 7,841,433 B2* | 11/2010 | Soliman et al. ............. 180/65.265 |
| 7,848,858 B2* | 12/2010 | Tabata et al. ............. 701/22 |
| 7,885,737 B2* | 2/2011 | Hirata et al. ............. 701/22 |
| 7,891,450 B2* | 2/2011 | Soliman et al. ............. 180/65.265 |
| 7,908,063 B2* | 3/2011 | Sah ............. 701/51 |
| 7,908,067 B2* | 3/2011 | Soliman et al. ............. 701/54 |
| 7,941,259 B2* | 5/2011 | Tabata et al. ............. 701/54 |
| 7,971,666 B2* | 7/2011 | Yamazaki et al. ............. 180/65.265 |
| 2007/0260381 A1* | 11/2007 | Sah ............. 701/51 |
| 2008/0026898 A1* | 1/2008 | Supina et al. ............. 475/5 |

(Continued)

*Primary Examiner* — Jeffrey J Restifo
(74) *Attorney, Agent, or Firm* — David B. Kelley; MacMillan, Sobanski & Todd, LLC

(57) ABSTRACT

In a powertrain for a motor vehicle that includes a power source, a transmission driveably connected to the power source and wheels of the vehicle, an electric machine able to operate as an electric motor for transmitting power to at least some of the vehicle wheels, a method for controlling the powertrain includes operating the power source and the transmission in a desired gear to produce a first wheel torque in response to a demanded wheel torque, increasing the demanded wheel torque while turning the vehicle along a curved path, and using the electric motor to provide a second wheel torque, such that a combined magnitude of the first wheel torque produced in the desired gear and the second wheel torque is equal to or greater than the increased demanded wheel torque.

17 Claims, 6 Drawing Sheets

U.S. PATENT DOCUMENTS

| | | | |
|---|---|---|---|
| 2008/0196952 A1* | 8/2008 | Soliman et al. | 180/65.2 |
| 2008/0196953 A1* | 8/2008 | Soliman et al. | 180/65.2 |
| 2008/0196954 A1* | 8/2008 | Soliman et al. | 180/65.2 |
| 2009/0137361 A1* | 5/2009 | Matsubara et al. | 477/3 |
| 2009/0150035 A1* | 6/2009 | Soliman et al. | 701/54 |
| 2010/0041512 A1* | 2/2010 | Silveri et al. | 477/3 |

\* cited by examiner

PREVENTING GEAR SHIFT CYCLING OF A HYBRID ELECTRIC VEHICLE

BACKGROUND OF THE INVENTION

1. Field of the Invention

This invention relates generally to a powertrain for a hybrid electric vehicle (HEV), and in particular to avoiding cyclic shifting among gears of a transmission while the vehicle corners or turns on a winding road.

2. Description of the Prior Art

A motor vehicle powertrain having an internal combustion engine and an automatic transmission, in which discrete gear ratios are produced, typically has a shift schedule calibrated to schedule downshifts when the engine runs out of reserve power and to schedule upshifts as close as possible to tractive effort crossovers. The shift schedule is calibrated for use in a vehicle that is unloaded and on straight road since the vehicle generally operates in these conditions.

When the vehicle is negotiating a curve or turning a corner, the straight road calibration can cause a condition, wherein the transmission repetitively upshifts and downshifts between gears. Excessive gear shifting occurs when the vehicle begins to decelerate in the turn the driver tips-in, i.e., depresses the accelerator pedal either at a high rate or to a substantial portion of its travel, to maintain vehicle speed. As a result of the tip-in, the transmission downshifts. Because the vehicle begins to accelerate beyond the desired speed after the downshift is completed, the driver tips-out of the throttle causing an upshift to occur. This cyclic gear shifting continues until the vehicle exits the curve.

To avoid this frequent gear shifting, it is conventional to perform the downshift and to prevent a subsequent upshift. Although this procedure mitigates the shift frequency problem, it can lead to driver dissatisfaction due to the downshift that occurs upon entering the turn. Furthermore, the early downshift causes a fuel economy penalty attributable to remaining in the lower gear for longer period, whereas fuel economy is maximized in the higher gear.

SUMMARY OF THE INVENTION

In a powertrain for a motor vehicle that includes a power source, a transmission driveably connected to the power source and wheels of the vehicle, an electric machine able to operate as an electric motor for transmitting power to at least some of the vehicle wheels, a method for controlling the powertrain includes operating the power source and the transmission in a desired gear to produce a first wheel torque in response to a demanded wheel torque, increasing the demanded wheel torque while turning the vehicle along a curved path, and using the electric motor to provide a second wheel torque, such that a combined magnitude of the first wheel torque produced in the desired gear and the second wheel torque is equal to or greater than the increased demanded wheel torque.

The method uses an electric motor to provide torque to the wheels during cornering, in addition to the torque that transmitted from the transmission output, and to allow the vehicle to stay in the higher gear and therefore to reduce gear shift frequency. Preferably, the electric motor may be an electric rear axle drive (ERAD) or a crankshaft-integrated starter/generator (CISG), or a combination of these.

The electric machine torque can increase the available torque to supplement the current gear torque so that the desired wheel torque can be attained while remaining in the higher gear. Shift cycle frequency is reduced and a greater range of authority is attained with the accelerator pedal while remaining in the higher gear.

Vehicle acceleration is proportional to the degree of accelerator pedal displacement as the driver tips in to the accelerator pedal when beyond the midpoint of the corner without unnecessary gear changes. This reduces the effort of the driver while cornering by enabling the driver to adjust vehicle acceleration smoothly and precisely.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
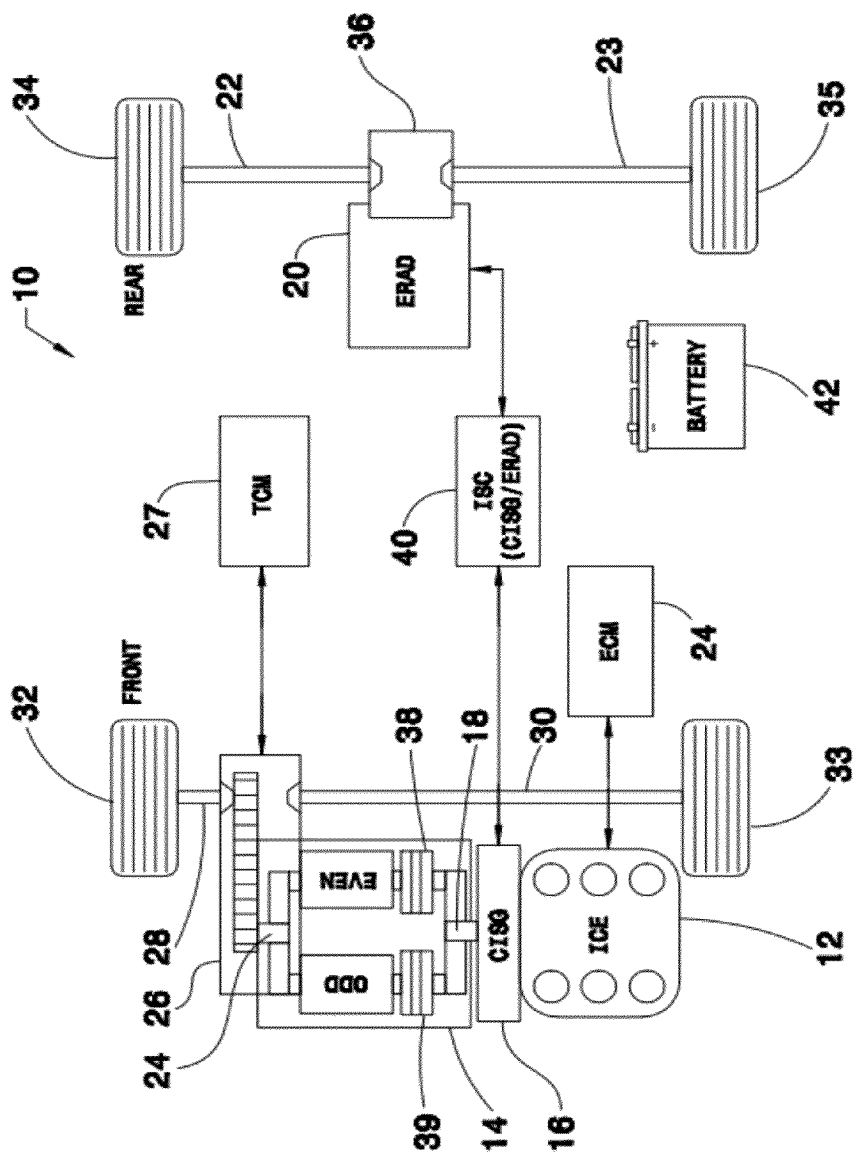
FIG. 1 is a schematic diagram showing an automotive vehicle powertrain for a hybrid electric vehicle.

Referring first to FIG. 1, the powertrain 10 for a hybrid electric vehicle includes a first power source such as an internal combustion engine 12, a diesel engine or a gasoline engine; an automatic transmission 14 producing multiple forward and reverse gear ratios; an electric machine 16 driveably connected to the engine crankshaft and transmission input 18, such as a crankshaft-integrated starter/generator (CISG) for providing starter/generator capability; and an additional electric machine 20 driveably connected to a rear axle differential mechanism 36, such as an electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 36, a differential mechanism 36, rear axles 22, 23 and wheels 34, 35.

The powertrain 10 comprises a first power path driveably connected to the load that includes CISG 16, transmission 14, final drive unit 26, axles 28, 30 and the wheels 32, 33. A gear of the transmission must be engaged between input 18 and output 24 and the input clutch 38 or 39 that is associated with the engaged gear must be engaged to complete a drive path between CISG 16 and the vehicle wheels 32, 33. Powertrain 10 also comprises a second power path driveably connected to the load that includes ERAD 20, ERAD gearing 48, a differential mechanism 36, rear axles 22, 23 and wheels 34, 35.

An electronic engine control module (ECM) 24 controls operation of engine 12. An electronic transmission control module (TCM) 27 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

Figure 2:
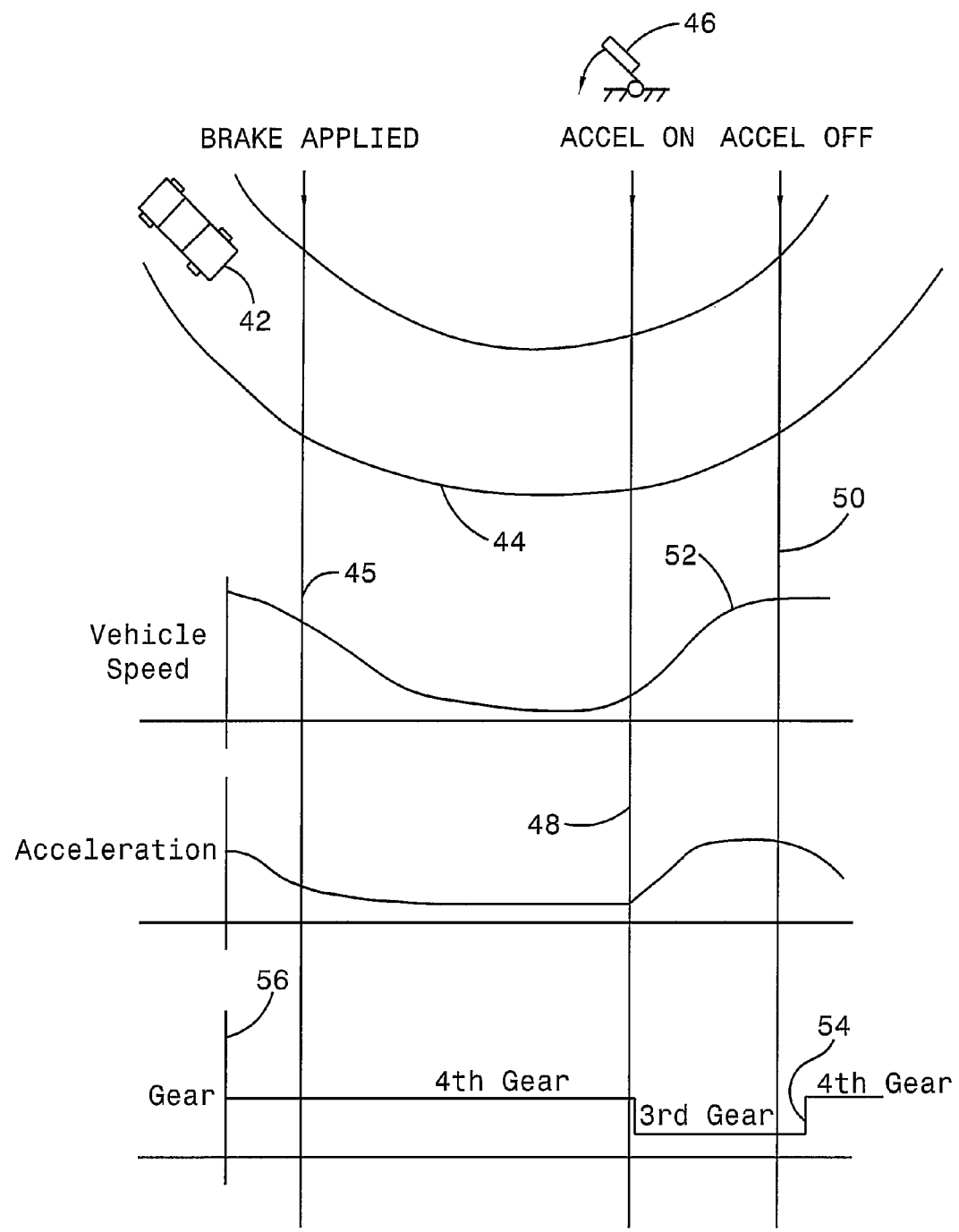
FIG. 2 is a schematic diagram showing the variation of speed, acceleration and gear of a vehicle while negotiating a curve.

The undesired gear shifting is illustrated in FIG. 2 with the HEV 42 entering a curve 44 while in fourth gear and having its wheel brakes applied at 45. The accelerator pedal 46 is depressed at 48 as the vehicle starts to exit the curve, causing a downshift to third gear. The driver eases off accelerator pedal 46 at 50 as the vehicle 10 accelerates to the desired speed 52. In response to this movement of the accelerator pedal 46, transmission 14 upshifts at 54 to fourth gear.

If the vehicle 42 were entering the curve 44 while accelerating in third gear, an upshift to fourth gear occurs at 56 when the curve is entered. Thereafter, the driver would tip-out of the accelerator pedal 46, potentially causing a 3-4-3-4 gear sequence through the curve. The shift hunting condition can be even more extreme if the vehicle were operating in several switch back curves (s-curves), which are frequently encountered in mountainous driving.

Figure 3:
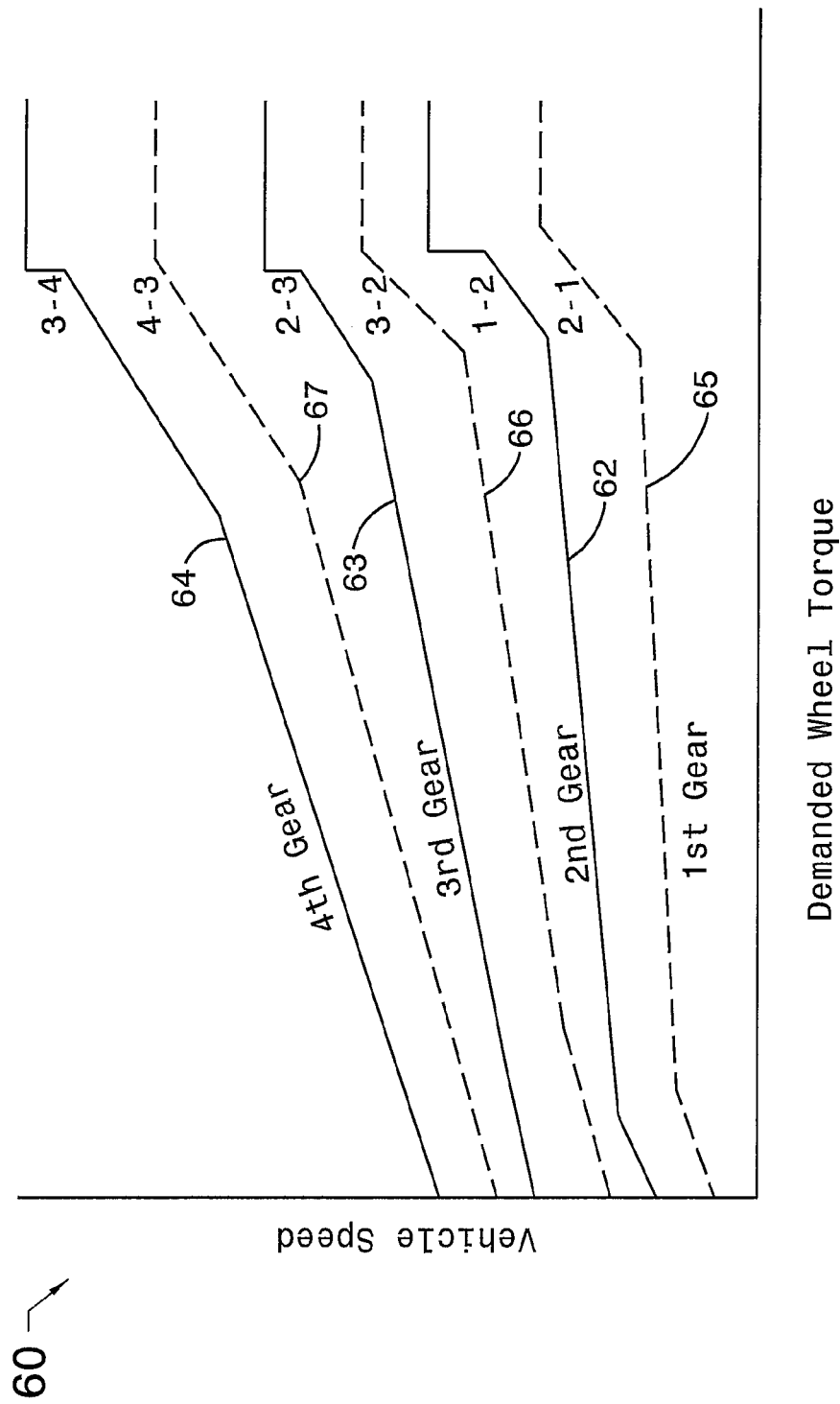
FIG. 3 is graph showing a shift schedule of gear changes produced by an automatic transmission.

Gear changes in a discrete ratio transmission 14 are produced according to a gear shift schedule 60, such as that illustrated in FIG. 3. The gear shift schedule is calibrated to schedule downshifts when the engine runs out of reserve power and upshifts as close as possible to the tractive effort crossovers. Driver demanded wheel torque is represented either by engine throttle position, for a vehicle without electronic throttle control (ETC); or by accelerator pedal position, for a vehicle with ETC. One of the criteria for shift scheduling calibration is to have good shift spacing so that the transmission does not cycle between upshifts 62-64 and downshifts 65-67 too frequently.

Figure 4:
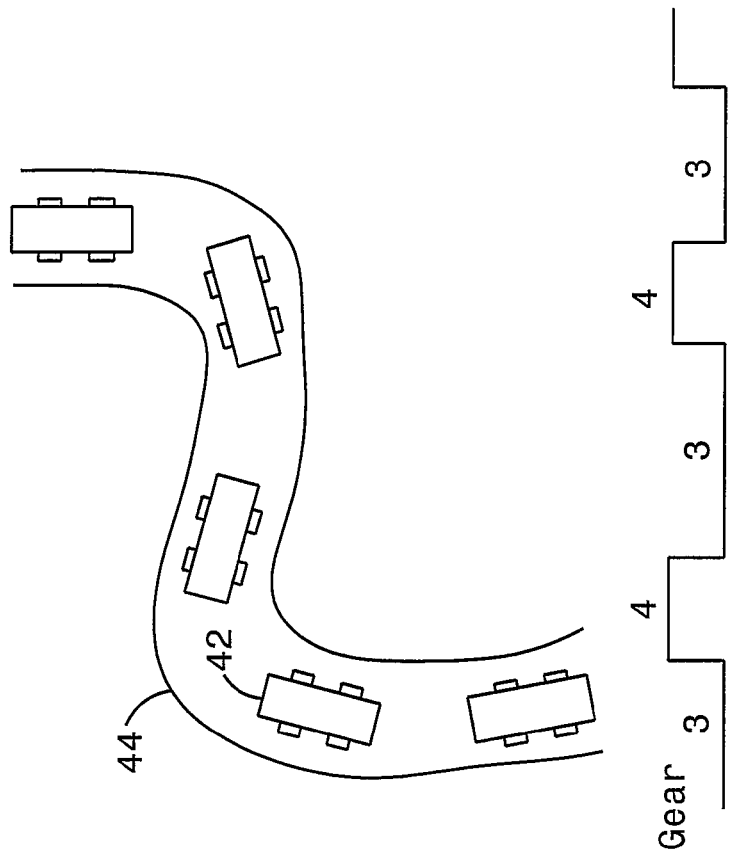
FIG. 4 is a diagram that illustrates multiple upshifts and downshifts between third and fourth gears as a vehicle turns through a series of curves.
Figure 5:
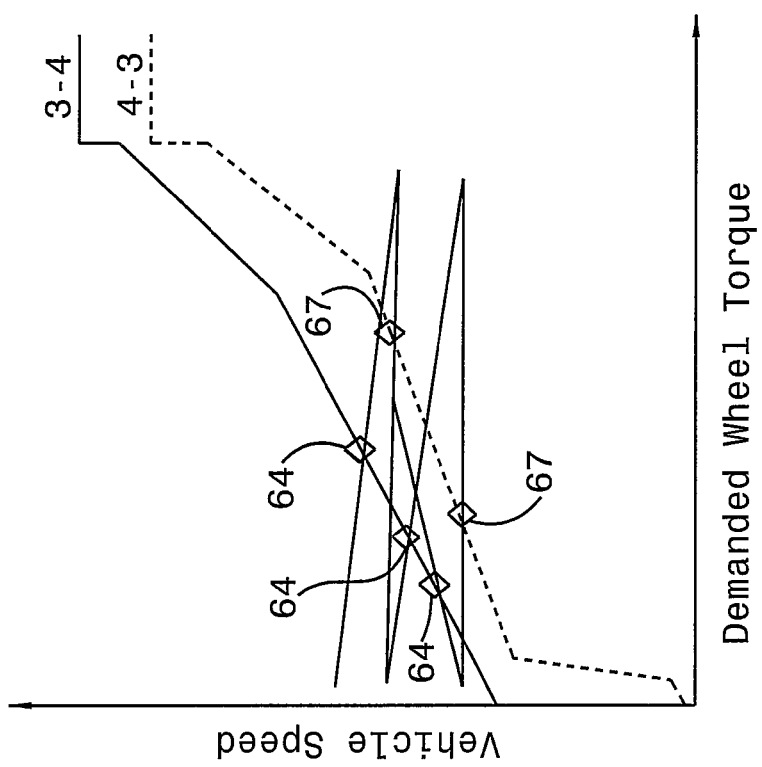
FIG. 5 is a shift schedule that illustrates gear changes of FIG. 4 occurring as the operating state crosses the gear change lines.

FIGS. 4 and 5 illustrate the occurrence of multiple upshifts and downshifts as the vehicle 42 turns through a series of curves 44. The driving pattern is a deceleration of the vehicle and a downshift 67 to third gear from fourth gear as it enters the curve, the wheel brakes are applied and the operating state, defined by demanded wheel torque and vehicle speed, crosses the 3-4 gear shift curve. This is followed by acceleration of the vehicle and an upshift 64 to fourth gear as the vehicle exits the curve when the driver tips into the accelerator pedal 46.

Figure 6:
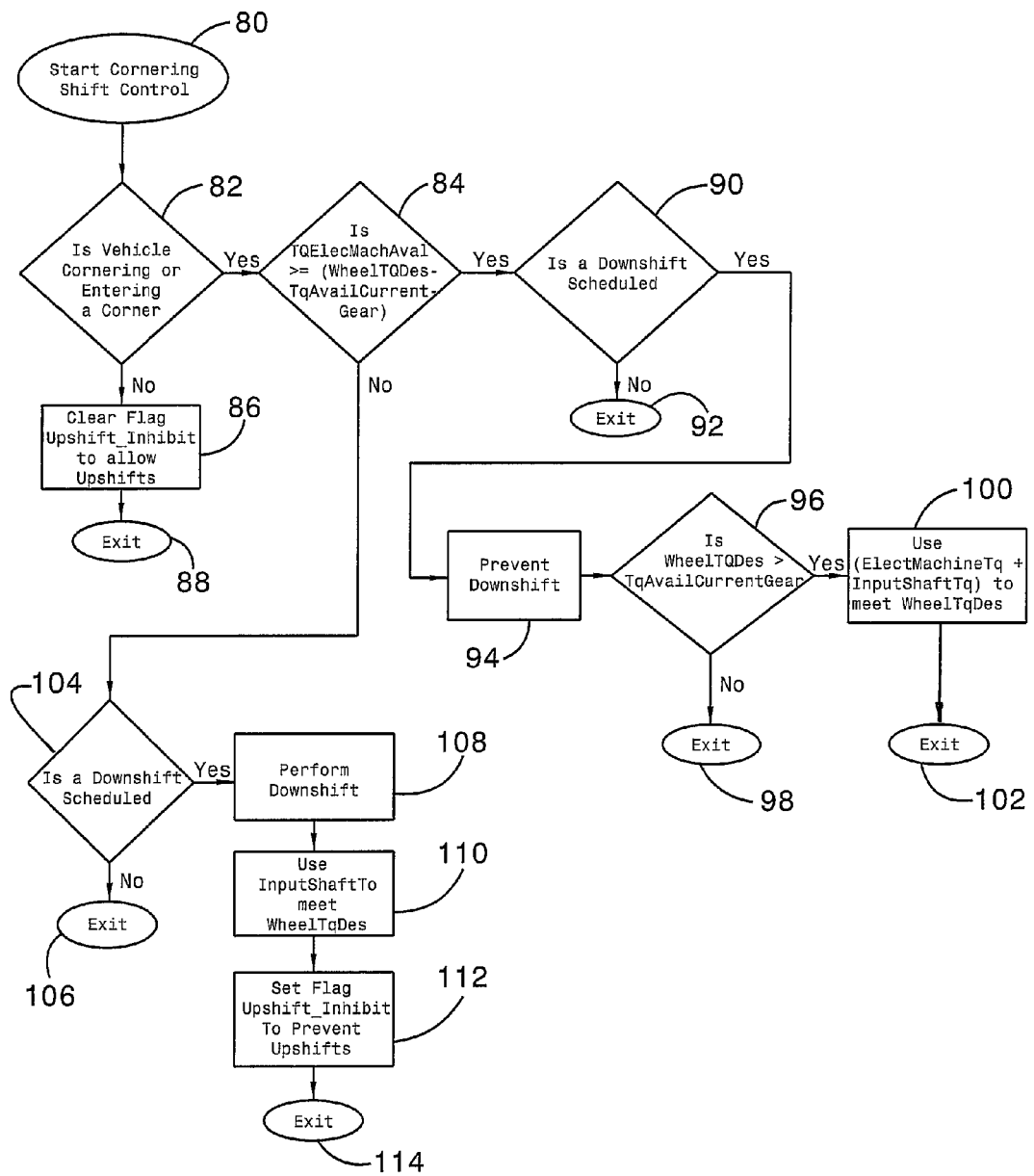
FIG. 6 is a logic flow diagram representing an algorithm for preventing gear shift cycling in a HEV.

FIG. 6 shows the steps of an algorithm for preventing gear shift cycling of a HEV 42 while the vehicle is turning through a curving roadway 44 or cornering. The algorithm is executed repetitively at intervals of about 8 ms.

After entering the cornering shift control at 80, a test is made at step 82 to determine whether the vehicle is cornering or entering a curve. Various techniques for detecting whether the vehicle is entering a curve include referencing a global position system, a steering angle sensor that produces a signal representing angular displacement of the vehicle's steering wheel from a reference position, or speed sensors that produce a signal representing the difference in speed of wheels on opposite sides of the vehicle, preferably wheels 34, 35 that are not being driven by a power source.

If the result of test 82 is logically true, at step 84 a test is made to determine whether an electric machine 16 that is driveably connected to the transmission input shaft 18 can provide sufficient wheel torque in the current gear in additional to the wheel torque provided by the engine 12 in the current gear to meet or exceed the wheel torque being demanded by the driver. Step 84 determines whether the CISG 16 is able currently to produce wheel torque in the current gear that is equal to or greater than the difference between the demanded wheel torque and the wheel torque produced by the engine in the current gear.

If the result of test 82 is logically false, at step 86 a flag called "Upshift Inhibit" is cleared to allow upshifts to occur, and at step 88 the algorithm is terminated and control returns to step 80.

If the result of test 84 is true, control advances to step 90 to determine whether a downshift is scheduled to occur. If the result of test 90 is false, at step 92 execution of the algorithm is terminated and control returns to step 80.

The preferred result of the algorithm is to remain in the current gear, the higher gear as long as possible while passing through the curve. The least preferable result is to downshift since it can accelerate the vehicle beyond the current driver demand and initiate shift cycling and reduce fuel economy.

If the result of test 90 is true, at step 94 the scheduled downshift is prevented.

At step 96, a check is made to determine whether the demanded wheel torque is greater than the wheel torque that can produced in the current gear by the engine 12; any other power source or sources, such as CISG 16, driveably connected to the input shaft; or a combination of the engine and the other power source or sources. If the result of test 96 is false, at step 98 execution of the algorithm is terminated and control returns to step 80.

If the result of test 96 is true, at step 100 an electric machine that is not driveably connected to transmission input shaft 18, such as ERAD 20, is used to provide sufficient wheel torque in addition to the torque transmitted to input shaft 18, thereby avoiding a downshift. At step 102, execution of the algorithm is terminated and control returns to step 80.

If the result of test 84 is false, control advances to step 104, to determine whether a downshift is scheduled. If the result of test 104 is false, execution of the algorithm is terminated at step 106 and control returns to step 80.

If the result of test 104 is true, the transmission 14 performs the scheduled downshift at step 108.

At step 110, the torque transmitted to input shaft 18 is used to produce the demanded wheel torque in the lower gear.

At step 112, the flag is set to prevent an upshift from the lower gear. At step 114, the algorithm is terminated and control returns to step 80.

Figure 7:
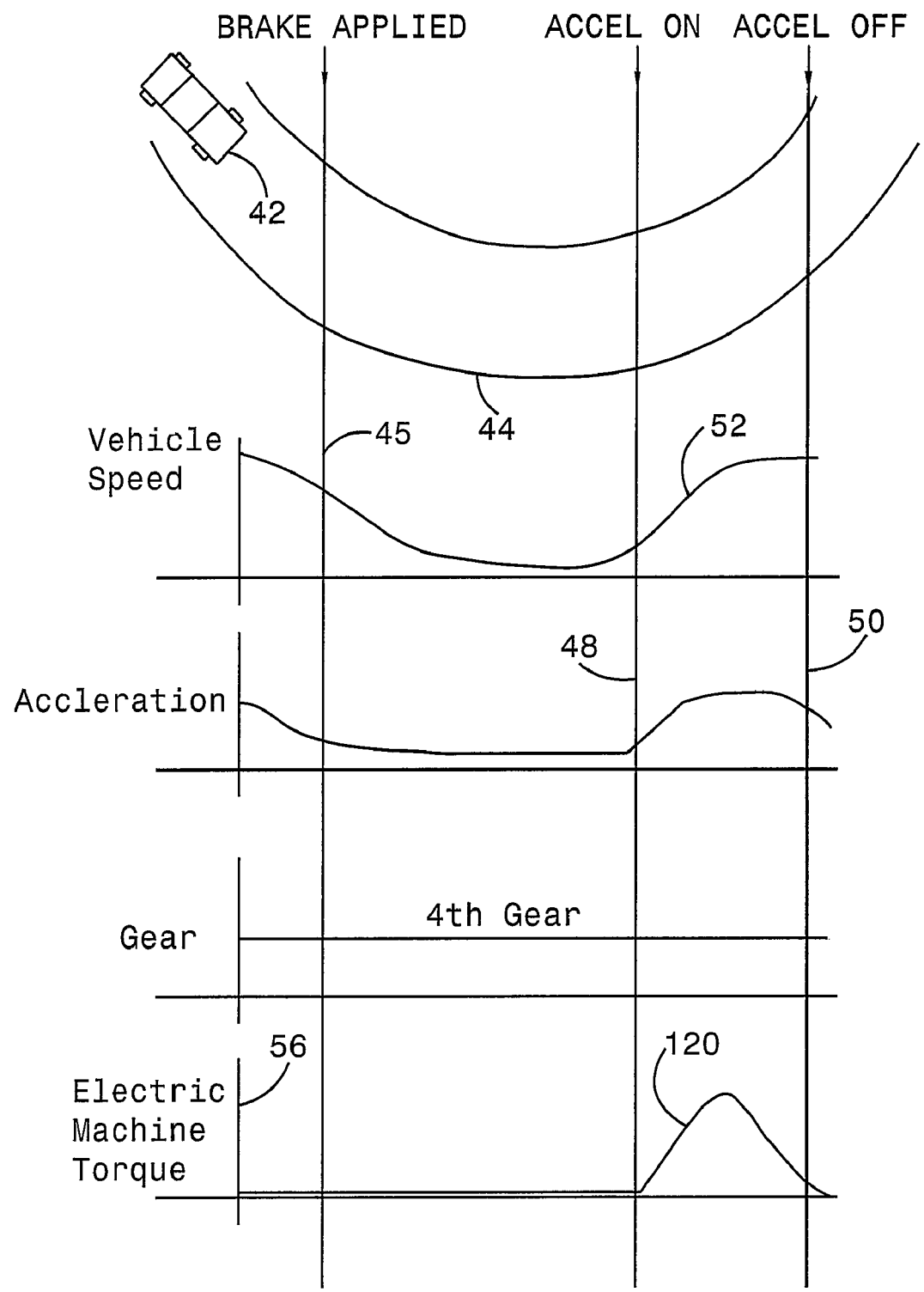
FIG. 7 is a schematic diagram showing the variation of speed, acceleration and gear of a vehicle while negotiating a curve under control of the algorithm of FIG. 6.

FIG. 7 illustrates use of torque 120 produced by electric machine 20 in response to depressing the accelerator pedal 46 at 48. Torque 120 increases the wheel torque produced in the current gear, fourth gear, by torque transmitted to transmission input shaft 18 in order to meet the demanded wheel torque without need for a downshift.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle powertrain, comprising:
   (a) producing a first wheel torque by transmitting torque from a power source and a motor to a transmission input in response to a demanded wheel torque;
   (b) using a second motor connected to an output of the transmission to increase wheel torque greater than an increased demanded wheel torque while the vehicle is cornering and without downshifting.

2. The method of claim 1 further comprising operating the transmission in a desired gear to produce the first wheel torque and the increased wheel torque.

3. The method of claim 1 wherein the increased demanded wheel torque occurs upon exiting a cornering maneuver.

4. The method of claim 1 further comprising the steps of:
preparing a gear shift schedule that establishes a boundary between a range of operating states for each transmission gear as a function of the demanded wheel torque and vehicle speed; and
using the demanded wheel torque, the vehicle speed and the shift schedule to determine a desired gear.

5. The method of claim 1 wherein step (b) further comprises the steps of:
determining a current magnitude of wheel torque able to be produced by the motor; and
using the second motor to increase wheel torque greater than an increased demanded wheel torque, if the current magnitude of wheel torque able to be produced by the second motor is equal to or greater than a difference between the increased demanded wheel torque and the first wheel torque.

6. The method of claim 1 wherein step (b) further comprises the steps of:
determining a current magnitude of wheel torque able to be produced by the motor; and
making no use of the motor, if the current magnitude of wheel torque able to be produced by the motor is less than a difference between the demanded wheel torque and the first wheel torque; and
performing a downshift.

7. A method for controlling a vehicle powertrain, comprising:
(a) operating an engine and a transmission in a current gear to produce a first wheel torque;
(b) if a first wheel torque produceable by the engine and a motor connected to an input of the transmission is less than demanded wheel torque, performing a downshift;
(c) using a second motor connected to an output of the transmission to increase wheel torque greater than an increased demanded wheel torque while the vehicle is cornering without downshifting.

8. The method of claim 7 further comprising the step of:
determining that the second electric motor has a current ability to produce a second wheel torque, whose magnitude is equal to or greater than a difference between the increased demanded wheel torque and the first wheel torque.

9. The method of claim 7 wherein step (c) further comprises the step of:
determining that the increased demanded wheel torque is greater than the first wheel torque able to be produced in the current gear by the engine and first electric motor.

10. The method of claim 7 wherein step (b) further comprises the step of increasing the demanded wheel torque upon exiting a curved path.

11. The method of claim 7 further comprising the steps of:
preparing a gear shift schedule that establishes a boundary between a range of operating states for each transmission gear as a function of the demanded wheel torque and vehicle speed; and
using the demanded wheel torque, the vehicle speed and the shift schedule to determine the current gear.

12. The method of claim 7 wherein step (d) further comprises the steps of:
determining a current magnitude of wheel torque able to be produced by the second motor; and
using the second motor to provide the second wheel torque, if the current magnitude of wheel torque able to be produced by the second electric motor is equal to or greater than a difference between the increased demanded wheel torque and the magnitude of wheel torque able to be produced in the current gear.

13. The method of claim 7 wherein step (b) further comprises the steps of:
determining a current magnitude of wheel torque able to be produced by the motor; and
making no use of the motor, if the current magnitude of wheel torque able to be produced by the motor is less than a difference between the demanded wheel torque and the magnitude of the first wheel torque able to be produced in the current gear.

14. A method for controlling a vehicle powertrain, comprising:
(a) operating an engine and transmission to produce wheel torque;
(b) if a first wheel torque producable by the engine and a motor connected to an input of the transmission is less than demanded wheel torque, performing a downshift;
(c) if a first wheel torque producable by the engine and the motor is greater than demanded wheel torque, using a second motor connected to an output of the transmission to increase wheel torque greater than an increased demanded wheel torque while the vehicle is cornering without downshifting.

15. The method of claim 14 wherein step (d) further comprises the steps of:
determining a current magnitude of wheel torque able to be produced by the motor; and
making no use of the motor, if the current magnitude of wheel torque able to be produced by the motor is less than a difference between the demanded wheel torque and the magnitude of the first wheel torque able to be produced in the current gear.

16. The method of claim 14 further comprising the step of:
determining that the second electric motor has a current ability to produce a second wheel torque, whose magnitude is equal to or greater than a difference between the increased demanded wheel torque and the first wheel torque.

17. The method of claim 14 wherein step (d) further comprises the step of:
determining that the increased demanded wheel torque is greater than the first wheel torque able to be produced in the current gear by the engine and first motor.

* * * * *